US 12,499,917 B2

United States Patent
Chen et al.

(10) Patent No.: US 12,499,917 B2
(45) Date of Patent: Dec. 16, 2025

(54) INRUSH CURRENT MANAGEMENT IN A MEMORY ARRAY

(71) Applicant: Arm Limited, Cambridge (GB)

(72) Inventors: Andy Wangkun Chen, Austin, TX (US); Yew Keong Chong, Austin, TX (US)

(73) Assignee: Arm Limited, Cambridge (GB)

( * ) Notice: Subject to any disclaimer, the term of this patent is extended or adjusted under 35 U.S.C. 154(b) by 64 days.

(21) Appl. No.: 18/427,637

(22) Filed: Jan. 30, 2024

(65) Prior Publication Data

US 2025/0246214 A1 Jul. 31, 2025

(51) Int. Cl.
  *G11C 7/10* (2006.01)
  *G11C 5/14* (2006.01)
  *G11C 11/417* (2006.01)

(52) U.S. Cl.
  CPC ............ *G11C 5/148* (2013.01); *G11C 7/1003* (2013.01); *G11C 11/417* (2013.01)

(58) Field of Classification Search
  CPC ...... G11C 5/148; G11C 7/1003; G11C 11/417
  See application file for complete search history.

(56) References Cited

U.S. PATENT DOCUMENTS

| | | | |
|---|---|---|---|
| 9,343,117 B1 * | 5/2016 | Lee | G11C 5/025 |
| 11,545,192 B2 * | 1/2023 | Wan | G11C 5/148 |
| 11,776,587 B2 * | 10/2023 | Chang | G11C 5/147 |
| | | | 365/226 |
| 2014/0192583 A1 * | 7/2014 | Rajan | G11C 7/10 |
| | | | 365/63 |
| 2015/0009772 A1 * | 1/2015 | Chen | G11C 5/148 |
| | | | 365/227 |
| 2016/0306412 A1 * | 10/2016 | Kolla | G06F 1/3287 |
| 2020/0402570 A1 * | 12/2020 | Goel | G11C 11/413 |
| 2023/0178122 A1 * | 6/2023 | Jain | G11C 7/1093 |
| | | | 365/226 |

* cited by examiner

*Primary Examiner* — Khamdan N. Alrobaie
(74) *Attorney, Agent, or Firm* — Berkeley Law & Technology Group, LLP (57) ABSTRACT

Inrush current in a memory such as SRAM cache may be managed by using one or more integrated delay elements such as inverters, RC delay lines, and the like to significantly slow down power down signal propagation between memory instances in a memory array. The delay in some examples may be between memory instances, while in other examples the delay is also introduced between bitcell arrays within a memory instance. By staggering the power up times of interconnected or chained memory instances, inrush current when powering the memory instances on or resuming from an inactive state may be reduced.

20 Claims, 6 Drawing Sheets

INRUSH CURRENT MANAGEMENT IN A MEMORY ARRAY

FIELD

The field relates generally to power management in a memory, and more specifically to inrush current management in a memory array.

BACKGROUND

Computers store information in a variety of ways, including magnetic disk storage that has high capacity and retains its data after power is no longer supplied, nonvolatile semiconductor memory such as flash memory that similarly retains its state when power is disconnected, and volatile memory such as Static Random Access Memory (SRAM) and Dynamic Random Access Memory (DRAM) that operate more quickly but that do not retain their data states when power is removed. SRAM uses semiconductor devices such as transistors to store data, while DRAM typically uses a small capacitor to store data state and must be "refreshed" or rewritten every few seconds or it may lose its data state. Although SRAM bitcell structures are typically larger than DRAM bitcell structures, they operate faster and are therefore preferred for applications such as cache and for internal registers of a CPU. Slower but cheaper DRAM is commonly used for a computer's main memory, where capacity is the primary concern.

SRAM typically comprises a bitcell array of memory cell or bitcell structures that are each operable to store a bit (e.g., a one or zero value) of information, along with peripheral circuitry such as address decoders and circuitry operable to write or erase the contents of bitcells in the bitcell array. In some examples, the bitcell memory cell structures may be addressable via peripheral circuitry as words, where each word comprises a number of bits such as eight bits, 16 bits, 32, bits, or 64 bits that represent a single unit of data that is handled by the processor. A typical modern processor may have a number of registers used during execution of program instructions to store instruction operands and results, each of which may be formed using SRAM or a similar memory structure.

Similarly, frequently-used data may be stored in a cache local to the processor, which may typically contain tens of thousands or hundreds of thousands (or more) of words of data per core in the processor. Local cache made of SRAM bitcell arrays makes retrieval of this often-used data faster than if the same data was retrieved from main memory (or DRAM), which is typically slower and not stored local to the processor. Because SRAM registers, cache, and the like may often be integrated onto the processor die along with processor cores, graphics processors, and the like, they may take up a significant percentage of the processor die area, transistor count, and power consumed by the integrated device. When a processor is powered on, these large bitcell arrays of cache memory may contribute significantly to power inrush as the bitcell arrays and control circuitry draw current to enter a powered-on or ready state.

BRIEF DESCRIPTION OF THE DRAWINGS

The claims provided in this application are not limited by the examples provided in the specification or drawings, but their organization and/or method of operation, together with features, and/or advantages may be best understood by reference to the examples provided in the following detailed description and in the drawings, in which:

Reference is made in the following detailed description to accompanying drawings, which form a part hereof, wherein like numerals may designate like parts throughout that are corresponding and/or analogous. The figures have not necessarily been drawn to scale, such as for simplicity and/or clarity of illustration. For example, dimensions of some aspects may be exaggerated relative to others. Other embodiments may be utilized, and structural and/or other changes may be made without departing from what is claimed. Directions and/or references, for example, such as up, down, top, bottom, and so on, may be used to facilitate discussion of drawings and are not intended to restrict application of claimed subject matter. The following detailed description therefore does not limit the claimed subject matter and/or equivalents.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

One embodiment disclosed herein is directed to a method of controlling application of a power signal to a plurality of memory instances formed in a device, each memory instance comprising peripheral circuitry and one or more bitcell arrays, the method comprising: receiving a power down signal at a bitcell array power input terminal of a first memory instance of the plurality of memory instances, the power down signal operable to power up or down one or more bitcell arrays in the first memory instance; providing a delayed bitcell array power ready signal at a first output terminal of the first memory instance, and providing a control circuitry power ready signal at a second output terminal of the first memory instance; and receiving the delayed bitcell array power ready signal at a bitcell array power input terminal of a second memory instance of the plurality of memory instances and receiving the control circuitry power ready signal at a retention power input terminal of the second memory instance, wherein the control circuitry power ready signal received at the retention power input terminal of the second memory instance controls application of power to peripheral circuitry of the second memory instance.

Another embodiment disclosed herein is directed to apparatus, comprising: a first memory instance comprising one or more first bitcell arrays, a first power input terminal to receive a power down signal, a first output terminal to provide a delayed bitcell array power ready signal, and a second output terminal to provide a control circuitry power ready signal; and a second memory instance comprising one or more second bitcell arrays, a second power input terminal to receive the delayed bitcell array power ready signal, and a retention power input terminal to receive the control circuitry power ready signal, the second memory instance comprising circuitry such that the control circuitry power ready signal received at the retention power input terminal of the second memory instance controls application of power to peripheral circuitry of the second memory instance.

Yet another embodiment disclosed here is directed to an article comprising: a non-transitory computer-readable medium to store computer-readable code for fabrication of a memory device comprising: a first memory instance to be formed in a circuit device, the first memory instance to comprise one or more first bitcell arrays, a first power input terminal to receive a power down signal, a first output terminal to provide a delayed bitcell array power ready signal, and a second output terminal to provide a control circuitry power ready signal; and a second memory instance to be formed in the circuit device, the second memory instance to comprise one or more second bitcell arrays, a second power input terminal to receive the delayed bitcell array power ready signal, a retention power input terminal to receive the control circuitry power ready signal, and circuitry to apply the control circuitry power ready signal received at the retention power input terminal of the second memory instance to control application of power to peripheral circuitry of the second memory instance.

Data storage in computerized systems typically includes nonvolatile storage such as magnetic disk storage or flash memory that retains data such as an operating system, installed programs, saved files, and the like when a computer is powered off as well as volatile memory that loses its contents when power is removed. Volatile memory is typically much faster at reading and writing data, and so is used to hold certain operating system components, executing programs, and other data being actively used while a computer is powered on.

Common types of memory employed in computer systems include main memory that is often comprised of Dynamic Random Access Memory (DRAM), and cache memory and registers that are often comprised of Static Random Access Memory (SRAM). DRAM is generally imparts an access latency higher than that of SRAM, but takes fewer components to build per memory cell. DRAM may store a memory state in a capacitive structure to be refreshed on the order of every few seconds to maintain its contents. SRAM may use a larger structure comprising several transistors such as Metal Oxide Semiconductor Field Effect Transistors (MOSFETs) to store data, but may operate with a lower access latency than that of DRAM and so may be preferred for applications where execution speed is more important than capacity such as in cache memory or processor registers.

Memory such as SRAM or DRAM may be built from semiconductors such as on an integrated circuit substrate as an array of bitcells that can each store a single bit of information (typically represented by a one or a zero state). Bitcells may be addressable for reading or writing via peripheral circuitry that accesses the desired bitcells using a combination of bitlines and wordlines, and includes the ability to read from and/or write to addressed bitcells. Bitcells are often addressed by words rather than by individual bitcell addresses, where each word comprises a number of bits (typically a power of two ranging from eight to 64) that make up a base unit of data handled by the processor. A modern 64-bit processor may therefore primarily work with 64-bit words (or may address bitcells 64 bits at a time), but in various examples may also perform single-bit operations or work with other word sizes as well for certain operations. A processor may also have multiple registers for use during execution of software instructions to hold data such as the operands and results being used for each instruction, typically on the order of tens of registers per processor core.

While a relatively slower DRAM may be desirable for main memory of a computer where capacity may be a greater concern than access latency, SRAM may be more applicable for use in processor registers and for cache memory located near the processor core (and often on the same die or substrate as the processor cores) where access latency is of greater concern. Cache memory may store data that is also stored in main memory, but because cache may comprise lower latency SRAM bitcells and may be small in size relative to main memory, cache may provide for faster processor access to data the processor is likely to use soon. A computing device may have multiple levels of cache (e.g., L1, L2, L3, etc.), because smaller caches have lower latency or higher speed but are less likely to contain the desired data than a larger cache. While SRAM may be used for cache memory, some processors, Multi-Chip Modules (MCMs), or Application-Specific Integrated Circuits (ASICs) may also use eDRAM, which is DRAM integrated on the same die or MCM as the processor or ASIC.

Processors may consume many tens or even hundreds of watts while powered up and operational, and the current to power on the processor may significantly exceed the peak current observed during normal operation due to setting initial states of all the processing circuitry and memory such as SRAM cache also located on the processor die. Similarly, powering up relatively large arrays of DRAM may result in significant current inrush due to the large number of DRAM bitcells that are powered on to start the computer. Because components such as DRAM, processors incorporating large banks of SRAM cache, and graphics processors having large banks of memory may be powered up at the same time a computer is powered up, the amount of inrush current drawn can be significant, and may heavily tax the current capabilities of power supply components in the computer.

Some examples presented herein therefore provide for improved memory inrush current management, such as by using one or more integrated delay elements to significantly delay power up signal propagation throughout a memory array. In one example, a power signal is applied to memory instances, such as different banks or subsets of memory within a memory array, sequentially by use of line delays and/or inverter delays integrated into the memory instances to power up the instances of memory over time.

In a more detailed example, a power signal is applied to memory instances that each comprise a bitcell array and peripheral control circuitry by receiving a power down signal (PDW) at a bitcell array power input terminal of a first memory instance. Such a power down signal may be operable to power up or power down one or more bitcell arrays in the first memory instance and is coupled to one or more delay elements within the memory instance. A delayed bitcell array power ready signal (PRDYNC) may be provided at a first output terminal of the first memory instance responsive to powering on or off via the received power down signal. A control circuitry power ready signal (PRDYN) may be provided at a second output terminal of the first memory instance responsive to receiving a control circuitry power signal at a retention power input terminal of the first memory instance. The delayed bitcell array power ready signal may be received at a bitcell array power input terminal of a second memory instance of the plurality of memory instances. Signal PRDYN may be received at a retention power input terminal (RET) of the second memory instance. Here, signal PRDYN received at the retention power input terminal of the second memory instance controls application of power to peripheral circuitry of the second memory instance.

Particular example embodiments may reduce an inrush current by staggering the interconnected or daisy-chained memory instances, thereby reducing inrush current incurred while powering the memory instances on or resuming from a powered down state. In another example, a power delay may be provided between bitcell arrays within a single memory instance, thereby reducing the inrush current caused within a single memory instance by staggering initiation of application of power various bitcell arrays within the memory instance. Techniques such as these may be combined in some embodiments, staggering both the powering up of bitcell arrays within a memory instance and the powering up or interconnected memory instances.

Figure 1:
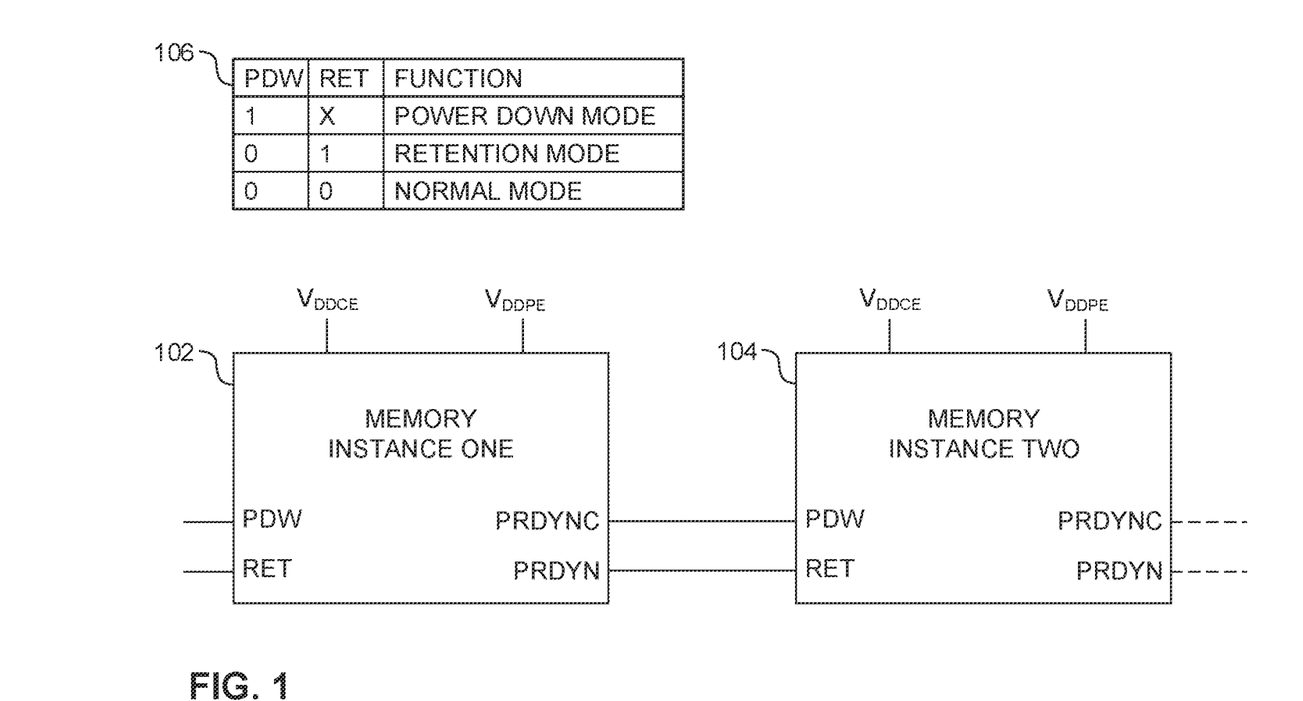
FIG. 1 is a block diagram of sequentially coupled memory instances incorporating internal delays to reduce inrush current, consistent with an example embodiment.

FIG. 1 is a block diagram of sequentially coupled memory instances incorporating internal delays to reduce inrush current, consistent with an example embodiment. A first memory instance is shown at 102, and a second memory instance is shown at 104 and is coupled to the first memory instance. While the particular example embodiment shows first memory instance 102 and second memory instance 104 that are interconnected and/or daisy chained, it should be understood that other embodiments may comprise three or more memory instances that are similarly interconnected and/or daisy chained. Each memory instance of FIG. 1 comprises a bitcell array power signal input labeled as PDW, or power down, and a peripheral control circuitry power signal input labeled as RET, or retention power. In a normal operating condition, both the bitcell array power signal PDW and the peripheral control circuitry or retention power signal are low, or a zero value. When a high or "one" value is received on the PDW or power down input terminal of a memory instance, a bitcell array responsively powers down irrespective of whether a bitcell array power source $V_{DDCE}$ is currently supplying power for the bitcell array. Similarly, when a high or one value is received on the peripheral control circuitry power signal input, or RET input, the peripheral control circuitry powers down irrespective of whether a power source $V_{DDPE}$ is supplying power to the peripheral control circuitry.

This power state of the bitcell array and the peripheral control circuitry may therefore be independently controlled using the PDW and RET inputs respectively, selectively applying power supplied via the $V_{DDCE}$ power supply input for the bitcell array and the $V_{DDPE}$ power supply input for the peripheral control circuitry. A table showing the memory instance power states resulting from various input conditions is shown at 106, indicating that when both PDW and RET control signals are zero or low, the memory is in a normal mode of operation. When the PDW input is high, the bitcell array (and in a further example the control circuitry) may be powered down or brought to a power down mode, while if the PDW input is low or zero but the RET input signal is high the memory instance may be brought to a retention mode where at least a portion of the control circuitry is powered down but the bitcell array remains powered to retain its memory state.

First memory instance 102 is connected to power down control signal at its PDW input and a retention mode control signal at its RET input, and is daisy-chained or sequentially linked to second memory instance 104 via delayed bitcell array power ready signal PRDYNC and control circuitry power ready signal PRDY. In some further examples, the PRDY signal may also be intentionally delayed within at least one of multiple daisy-chained memory instances. Signal PRDYNC of memory instance 102 is coupled to input terminal PDW of memory instance 104 such that when the bitcell array of memory instance 102 is powered up and ready it signals the bitcell array of memory instance 104 to power up. Similarly, signal PRDY of memory instance 102 is coupled to retention mode input terminal RET of memory instance 104, such that the control circuitry of memory instance 104 is powered up once it receives a signal from memory instance 102 that its control circuitry is powered up (e.g., no longer in retention mode).

By introducing a delay between receiving a power down control signal at a PDW input terminal and providing a bitcell array power ready signal at a PRDYNC output, memory instances such as memory instance 102 and 104 may be sequentially connected or daisy-chained and their bitcell arrays may power up sequentially with a delay between powering up the bitcell arrays of each such memory instance. By delaying startup of bitcell arrays in sequentially-coupled memory instances, the inrush current needed to power up the bitcell arrays may be reduced, such as by configuring the intentional delay in providing a power ready signal to reduce inrush current to an acceptable level.

Figure 2:
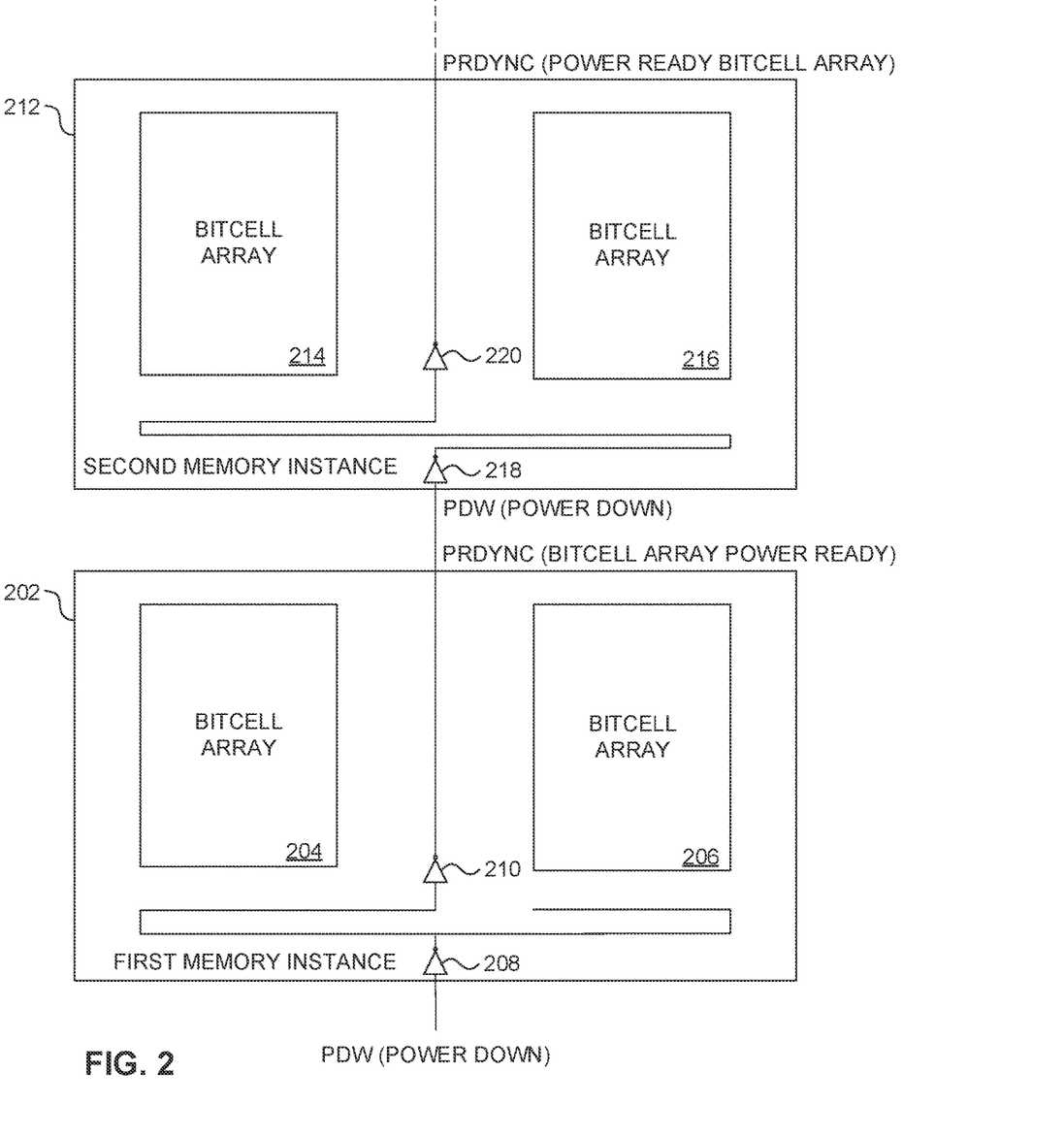
FIG. 2 is a block diagram of memory instances incorporating delay in powering up bitcells within each memory instance, consistent with an example embodiment.

Although the example of FIG. 1 shows how memory instances may be powered up sequentially with an intentional delay introduced between instances to manage inrush current, some embodiments may further incorporate delays between powering up bitcell arrays within a memory instance itself. FIG. 2 is a block diagram of memory instances incorporating delay in powering up bitcells within each memory instance, consistent with an example embodiment. Here, a power down signal may be provided to input PDW of a first memory instance, shown at 202. The simplified first memory instance in this example has two bitcell arrays, 204 and 206, and the received power down signal is inverted by inverter 208 before being distributed to the bitcell arrays via wire traces having a length and/or other characteristics configured to introduce an impedance delay, such as a resistance-capacitance delay or RC delay. The wire traces distributing the inverted power down signal to the bitcell arrays are coupled to inverter 210, which inverts the signal again before providing it as a bitcell array power ready output from memory instance one.

The inverters 208 and 210 may introduce delay to the received power down signal before providing it as an output at the first memory instance's bitcell array power ready output, and the wire between them may act as a delay wire having a delay based on its designed RC characteristics. An RC delay of the delay wire trace between inverters 208 and 210 not only introduces additional delay between the received power down signal and the bitcell array power ready output, but in a further example may also provide delay in powering up various bitcells within the bitcell arrays 204 and 206 (such as where different portions of the bitcell array are coupled to different portions of the delay wire). The first memory instance 202 of FIG. 2 therefore imparts delay in powering up bitcells both within the memory instance and between the input and output of the memory instance.

First memory instance 202 is here coupled to a second memory instance 212, similar to what is shown in FIG. 1, with a bitcell array power ready output signal of second memory instance 202 coupled to a power down input of second memory instance to sequentially power up the memory instances reducing inrush current throughout linked memory instances. Second memory instance 212 may comprise two bitcell arrays 214 and 216, along with inverters 218 and 220 coupled by a delay wire having an RC delay, much as in first memory instance 202. The delay wire of first memory instance 202 coupling inverter 208 to inverter 210 is configured to propagate to bitcell array 204 and bitcell array 206 at the same time, with a delay applied to each of the bitcell arrays via the delay wire's RC characteristics. In second memory instance 212, the delay wire coupling inverters 218 and 220 is configured to power up bitcell array 216 before powering up bitcell array 214, thereby further reducing inrush current in powering up the bitcell arrays in the second memory instance and introducing additional RC delay in the longer delay wire.

The examples of FIG. 2 show how an inserted delay in a bitcell array power signal may be incorporated via structures such as inverters or other logic gates, as well as via physical phenomena such as the resistance-capacitance or RC delay of a delay wire. The memory instance also illustrate how an inserted delay can be applied to powering up bitcells or bitcell arrays within a memory instance as well as between memory instances to further reduce inrush current upon powering on. Although the examples of FIG. 2 show a power down signal controlling the power state of the memory instances, the signal may be inverted (such as a power up signal) in other examples, or may take another form and similarly benefit from delay methods and structures such as those shown in the examples here to manage inrush current.

Figure 3:
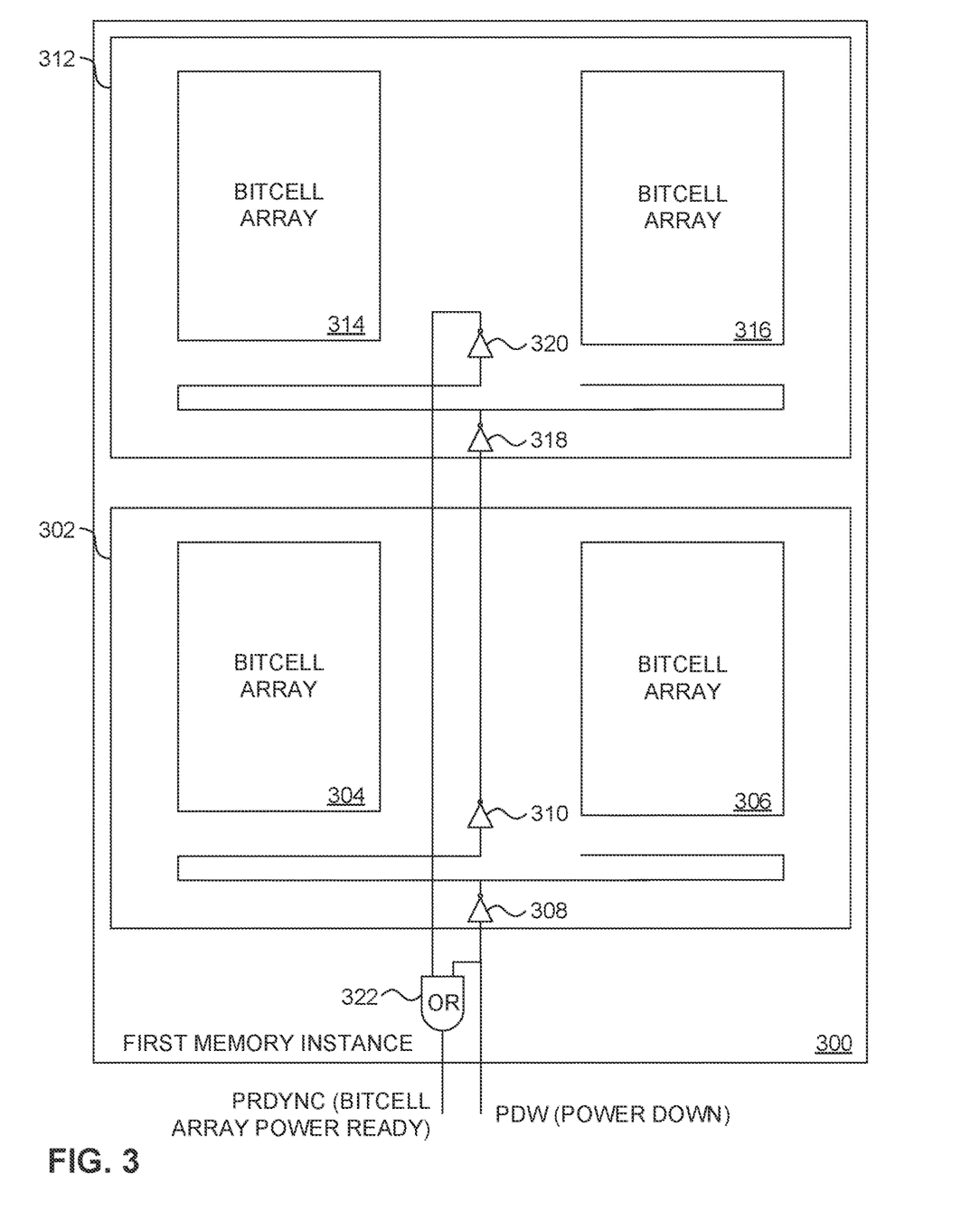
FIG. 3 is a block diagram of a memory instance incorporating multiple banks of bitcell arrays and an accelerated power down signal circuit, consistent with an example embodiment.

FIG. 3 is a block diagram of a memory instance incorporating multiple banks of bitcell arrays and an accelerated power down signal circuit, consistent with an example embodiment. Here, a first memory instance 300 comprises a first bank of bitcell arrays 302 and a second bank of bitcell arrays 312. First memory instance 300 also includes a power down input PDW, operable to control the power state of the bitcell arrays within the memory instance by selectively applying power via a power source such as $V_{DDCE}$ as shown in FIG. 1. A bitcell array power ready output signal is also provided from first memory instance 300, derived from delaying the power down input PDW.

First bank of bitcell arrays 302 comprises bitcell arrays 304 and 306, as well as inverters 308 and 310, and may operate much like the first memory instance of the example shown in FIG. 2. Inverters and wire delay line here may serve to both introduce delay in providing a bitcell array power signal to the second bank of bitcell arrays 312 and to stagger or delay powering up bitcells within bitcell arrays 304 and 306 by controlling the power state of these arrays via various points along the delay line linking inverters 308 and 310. Second bank of bitcell arrays 312 is in this example may be structured the same as the first bank of bitcell arrays 302, and similarly may contain bitcell arrays 314 and 316 having power states controlled by a delay line carrying a signal from inverter 318 to inverter 320.

Responsive to receipt of a power down signal (e.g., the PDW input shown at the bottom of FIG. 3 goes high), a power down signal is applied to the bitcell arrays within first bank 302 and second bank 312 via the wire delay lines linking inverters 308 to 310 and coupling inverter 318 to inverter 320. The power down signal may also be immediately provided to OR gate 322, causing a subsequent memory instance coupled to the bitcell array power ready output PRDYNC to change to a power down state without waiting for the power down signal to propagate through the inverters 308, 310, 318, 320, and the associated delay lines.

When the memory instance 300 receives a power up signal (i.e., the PDW input transitions to a low or zero signal), the low signal may propagate to inverter 308 and a positive value is distributed along the delay line linking inverters 308 and 310. Inverter 310 may invert the signal once received, sending a low or zero value to the next bank of bitcell arrays 312 where the signal is similarly inverted at inverter 318, distributed along a delay line to the bitcell arrays, and inverted again at inverter 320. An output of inverter 320 may transition to a low or zero signal that is sent to the OR gate 322, causing it to change states from a high or one output to a zero output.

The bitcell array power ready signal PDRYNC provided as an output from the first memory instance 300 is therefore delayed when entering a powered on state, such as when the power down signal received at the PDW input transitions from high to low, but is not delayed when the power down signal received at PDW transitions from low to high to power off the bitcell arrays in the memory instance. This allows for rapid power off of the bitcell arrays of large numbers of sequentially-linked memory instances, while preserving the desired delay in powering the bitcell arrays of the memory instances back on to reduce inrush current during power on.

Figure 4:
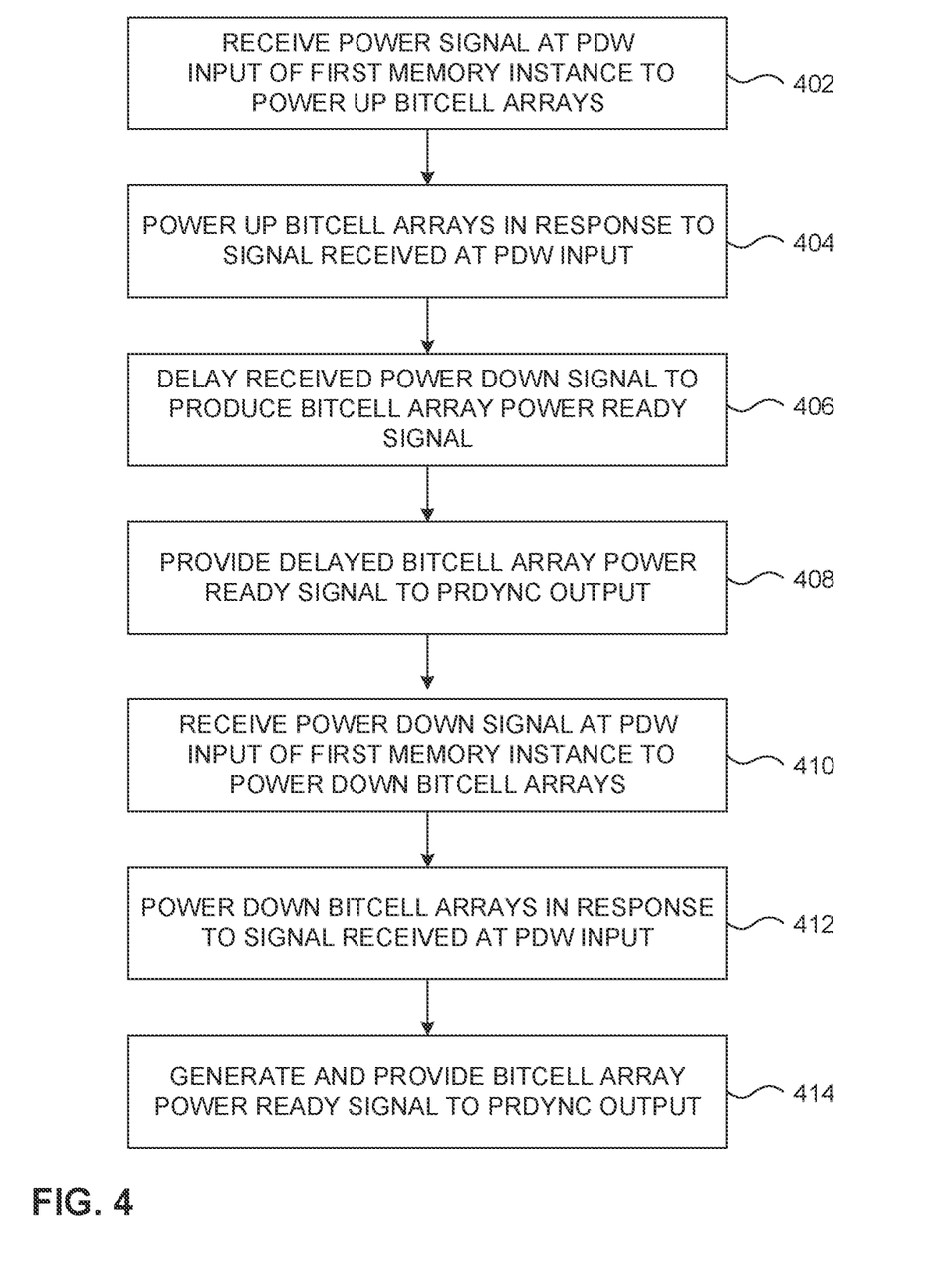
FIG. 4 is a flow diagram of a method of reducing inrush current when powering on memory instances, consistent with an example embodiment.

FIG. 4 is a flow diagram of a method of reducing inrush current when powering on memory instances, consistent with an example embodiment. At 402, a power signal is received at a power down (PDW) input of a first memory instance. Although the input is a power down signal in this example, and the power signal to power up bitcell arrays is a zero or low value, in other examples the power signal may be a power up signal (such as a one or high value) or any other suitable power state signal. The bitcell arrays are powered up at 404 in response to the received power signal, which in a further example comprises powering up different bitcell arrays or banks of bitcell arrays in a staggered or delayed fashion such as using inverters, RC delay lines, or the like to impart a delay on propagation of the received power signal through the memory instance.

A received power down signal may be delayed at 406 to provide a bitcell array power ready signal (PRDYNC) as an output of the memory instance at 408 upon the received power signal being propagated throughout the memory instance (e.g. to all the bitcell arrays in the memory instance). The delay may be due to internal delays between bitcell arrays in the memory instance as described in a further example at 404, may be due to a delay internal to the memory instance imposed before or after the bitcell arrays, or may be provided at any other point between the received power down signal (PDW) input and the provided bitcell array power ready signal (PRDYNC) output of the memory instance in various embodiments.

The process from 402-408 may be repeated in sequentially chained or coupled memory instances, such as where two or more memory instances are coupled by the bitcell array power ready (PRDYNC) signal of an earlier memory instance being coupled to the power down (PDW) input of a later or sequential memory instance. FIGS. 1 and 2 show examples of such sequential or daisy-chained memory instances. In other examples, a memory may comprise multiple daisy chains or sequences of memory instances, a memory instance output may be coupled to multiple memory instance inputs, or other such modifications may be made to the simplified sequential structure shown in FIGS. 1 and 2.

At 410, the received power down signal changes to power down the bitcell arrays, causing the bitcell arrays to power down in response to the received signal at 412. The power down signal in some examples follows the same delay path as a power up signal to generate a changed bitcell array power ready signal 414 in response to the received power down signal, such as the paths through memory instances shown in the examples of FIG. 2. In other examples, the power down signal is not delayed in the same manner as a power up signal (or inverse power down signal), but is propagated through the memory instance more rapidly than a corresponding inverse power down signal or power up signal would be propagated, such as is shown in the example of FIG. 3.

The process from 410-414 may also be repeated in sequentially chained or coupled memory instances, such as where the instances are coupled by the bitcell array power ready (PRDYNC) signal of an earlier memory instance being coupled to the power down (PDW) input of a later or sequential memory instance. Memory structures other than a simple daisy-chain may also be employed, such as arranging memory instances in multiple daisy chains or sequences of memory instances, coupling a memory instance output to multiple memory instance inputs, or other such modifications.

The flow diagram of FIG. 4 further demonstrates how an inserted power delay in powering up bitcell arrays in a memory such as an SRAM cache memory may be used to limit inrush current when the memory is powered on or is brought to an active state.

Figure 5:
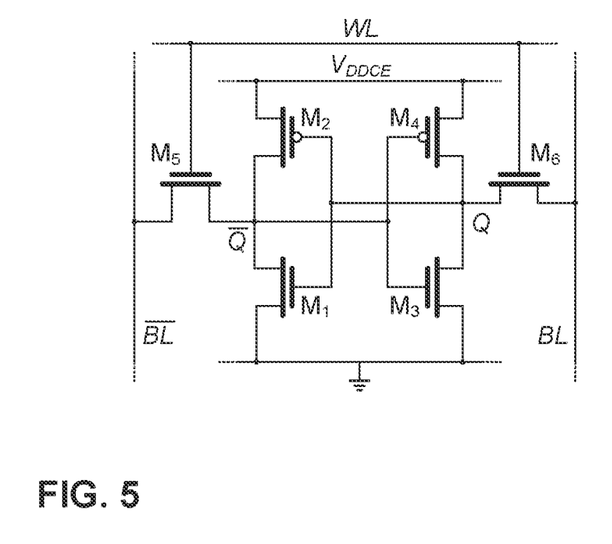
FIG. 5 is a schematic diagram of a static random access memory (SRAM) cell, consistent with an example embodiment.

FIG. 5 is a schematic diagram of a static random access memory (SRAM) cell, consistent with an example embodiment. The SRAM memory cell of FIG. 5 is often referred to as a 6T SRAM cell due to its six transistors, but other SRAM memory cell configurations exist and may also be used to form bitcell arrays such as those in the examples presented herein.

The memory cell can store a "bit" or single high or low state of information using the four transistors M1, M2, M3, and M4. These four transistors form two cross-coupled inverters, which are stable in either a high or low (i.e., a 1 or 0) state. Access transistors M5 and M6 control access to the cross-coupled inverters formed by M1, M2, M3, and M4 during read and write operations. Word lines denoted by WL and bitlines denoted by BL are used to select which memory bitcells in a bitcell array are being addressed, and use of both a bitline BL and inverse bitline $\overline{BL}$ may improve noise margins and speed of the SRAM bitcell.

In operation, the bitcell may operate in standby, reading, or writing states. In a standby state, the word line WL is not active, the access transistors M5 and M6 disconnect the cell from the bit lines, and the cross-coupled inverters formed by M1, M2, M3, and M4 reinforce each other to retain their state as long as they remain powered.

In a reading state, the word line WL is brought high, and one or both of the bitline BL and inverse bitline $\overline{BL}$ may be read to determine the state of the bitcell. Because the bitlines are often relatively long and have some parasitic capacitance, reading the state of a memory cell is often done by precharging both bitlines BL and $\overline{BL}$ with a one or high value, asserting the word line WL thereby enabling transistors M5 and M6, and observing which bitline voltage drops relative to the other bitline such as by using a comparator or sense amplifier to speed up the read operation.

To write a value to the bitcell the value to be applied is written to the bit lines, such as writing a one value as bringing bitline BL to a one or high state and $\overline{BL}$ to a zero or low state. The word line WL is then asserted, and the value to be stored is latched into the bitcell. In a more detailed example, the bit line inputs are driven with a strong enough voltage signal to overcome the relatively weak transistors in the bitcell such that they can easily override the previous state of the bitcell's cross-coupled inverters. Because the inverters are cross-coupled, a slight change in state to one of the inverters (e.g. transistor pair M1 and M2) will help overwrite the state of the other pair of inverters. Access NMOS transistors M5 and M6 may be further designed to be stronger than the transistors M1, M2, M3, and M4, contributing to the speed of the write process.

Arrays of SRAM may be formed in a two-dimensional grid, with row and column decoders in peripheral circuitry selecting wordlines and bitlines associated with bitcells based on their memory address to access the bitcells. Bitcells are often accessed one word at a time, where a word may comprise a byte (or 8 bits), or another power of two such as 16, 32, or 64 bits. In other examples, memory operations may be conducted on words, single bits, pages of words, or other units of addressable memory to write and store information in the SRAM.

The examples shown here demonstrate how inrush current in a memory such as SRAM cache may be managed by using one or more integrated delay elements such as inverters, RC delay lines, and the like to significantly slow down power down signal propagation between memory instances in a memory array. The delay in some examples may be between memory instances, while in other examples the delay is also introduced between bitcell arrays within a memory instance. Further examples may be configured to delay a power up signal, but to pass a power down signal more quickly through a series of sequentially-linked or daisy-chained memory instances. By staggering or delaying the power up times of interconnected or chained memory instances, inrush current when powering the memory instances on or resuming from an inactive state can be reduced.

Figure 6:
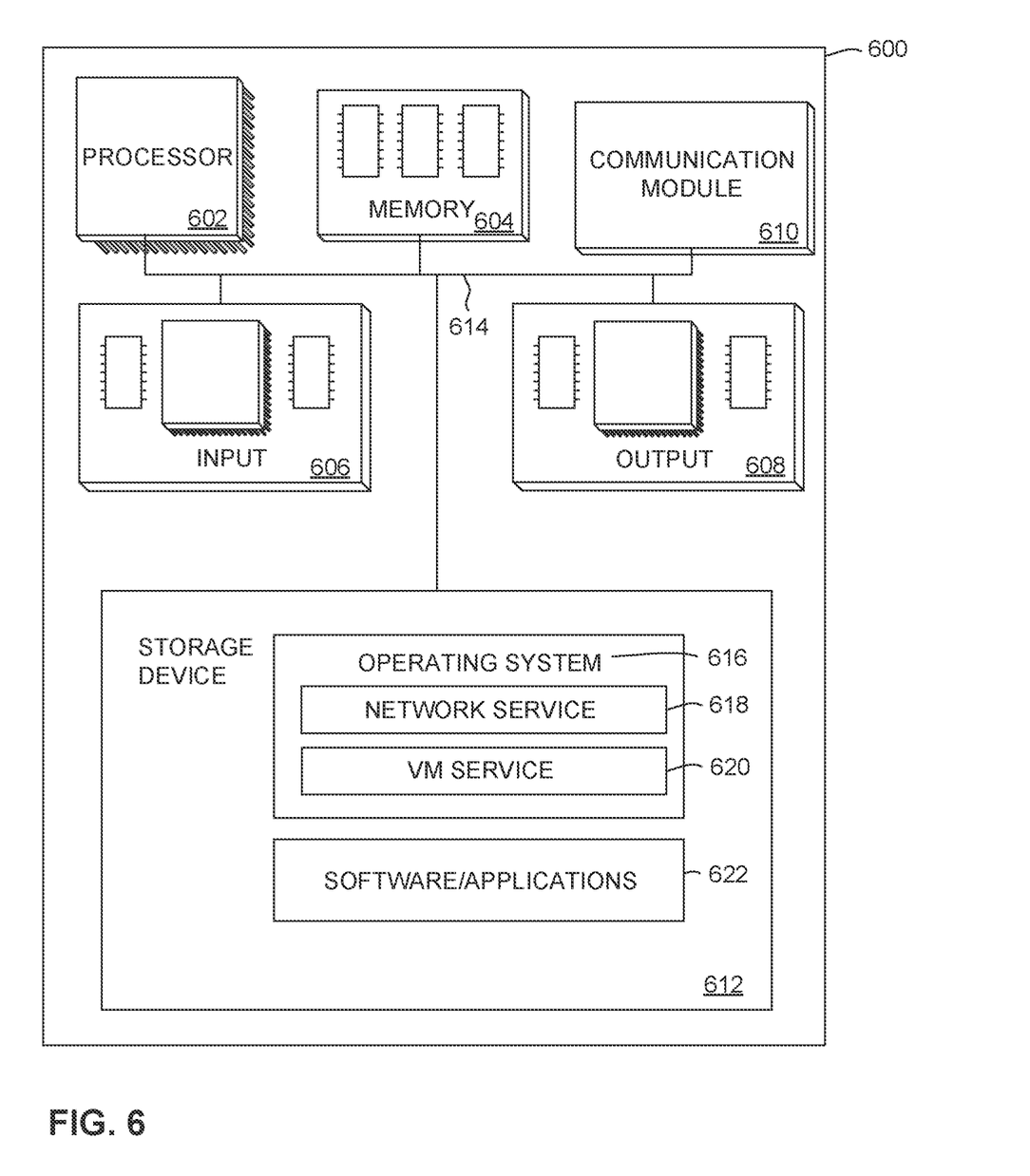
FIG. 6 shows a block diagram of a general-purpose computerized system, consistent with an example embodiment.

FIG. 6 shows a block diagram of a general-purpose computerized system, consistent with an example embodiment. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600, in one example, further includes an operating system 616 executable by computing device 600. The operating system includes in various examples services such as a network service 618 and a virtual machine service 620 such as a virtual server. One or more applications, such as image processor 1022 are also stored on storage device 1012, and are executable by computing device 600.

Each of components 602, 604, 606, 608, 610, and 612 may be interconnected (physically, communicatively, and/or operatively) for inter-component communications, such as via one or more communications channels 614. In some examples, communication channels 614 include a system bus, network connection, inter-processor communication network, or any other channel for communicating data. Applications such as software application 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 612, in some examples, is known as a computer-readable storage medium. In some examples, storage device 612 comprises temporary memory, meaning that a primary purpose of storage device 612 is not long-term storage. Storage device 612 in some examples is a volatile memory, meaning that storage device 612 does not maintain stored contents when computing device 600 is turned off. In other examples, data is loaded from storage device 612 into memory 604 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as software application 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 612 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 600 uses communication module 610 to wirelessly communicate with an external device such as via a public network.

Computing device 600 also includes in one example one or more input devices 606. Input device 606, in some examples, is configured to receive input from a user through tactile, audio, or video input. Examples of input device 606 include a touchscreen display, a mouse, a keyboard, a voice responsive system, video camera, microphone or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD or OLED), or any other type of device that can generate output to a user.

Computing device 600 may include operating system 616. Operating system 616, in some examples, controls the operation of components of computing device 600, and provides an interface from various applications such as software application 622 to components of computing device 600. For example, operating system 616, in one example, facilitates the communication of various applications such as software application 622 with processors 602, communication unit 610, storage device 612, input device 606, and output device 608. Applications such as image processor 622 may include program instructions and/or data that are executable by computing device 600. These and other program instructions or modules may include instructions that cause computing device 600 to perform one or more of the other operations and actions described in the examples presented herein.

Bitcell arrays, memory structures, memory instances, peripheral circuitry, and other circuits as described herein in particular examples may be formed in whole or in part by and/or expressed in transistors and/or lower metal interconnects (not shown) in processes (e.g., front end-of-line and/or back-end-of-line processes) such as processes to form complementary metal oxide semiconductor (CMOS) circuitry. The various blocks, neural networks, and other elements disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Features of example computing devices employed in example embodiments may comprise features, for example, of a client computing device and/or a server computing device. The term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU), image signal processor (ISP) and/or neural processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 and in the text associated with the foregoing figure(s) of the present patent application.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A method of controlling application of a power signal to a plurality of memory instances formed in a device, each memory instance comprising peripheral circuitry and one or more bitcell arrays, the method comprising:
   receiving a power down signal at a bitcell array power input terminal of a first memory instance of the plurality of memory instances, the power down signal operable to power up or down one or more bitcell arrays in the first memory instance;
   providing a delayed bitcell array power ready signal at a first output terminal of the first memory instance, and providing a control circuitry power ready signal at a second output terminal of the first memory instance; and
   receiving the delayed bitcell array power ready signal at a bitcell array power input terminal of a second memory instance of the plurality of memory instances and receiving the control circuitry power ready signal at a retention power input terminal of the second memory instance, wherein the control circuitry power ready signal received at the retention power input terminal of the second memory instance controls application of power to peripheral circuitry of the second memory instance.

2. The method of claim 1, and further comprising:
   providing a second delayed bitcell array power ready signal at a first output terminal of the second memory instance and a second control circuitry power ready signal at a second output terminal of the second memory instance; and
   receiving the second delayed bitcell array power ready signal at a bitcell array power input terminal of a third memory instance of the plurality of memory instances and receiving the second control circuitry power ready signal in a retention power input terminal of the third memory instance, wherein the second control circuitry power ready signal received at the retention power input terminal of the third memory instance controls application of power to peripheral circuitry of the third memory instance.

3. The method of claim 1, and further comprising:
   applying the power down signal to one or more power delay circuits formed in the first memory instance to provide the delayed bitcell array power ready signal.

4. The method of claim 3, wherein at least one of the one or more power delay circuits comprise a wire length sufficient to impart a desired resistance-capacitance delay on the power signal.

5. The method of claim 3, wherein the first memory instance comprises a plurality of bitcell arrays, and wherein the one or more power delay circuits are interleaved between and/or among the plurality of bitcell arrays such that the bitcell arrays are powered up sequentially.

6. The method of claim 3, wherein the one or more power delay circuits further comprise one or more inverters or buffers, or a combination thereof.

7. The method of claim 6, wherein the one or more inverters are located between bitcell arrays or between groups of bitcell arrays in the first memory instance.

8. The method of claim 1, wherein the provided control circuitry power ready signal in the first memory instance is derived from a control circuitry power ready signal received at a retention power input terminal of the first memory instance.

9. The method of claim 8, further comprising applying the control circuitry power ready signal received at a retention power input terminal of the first memory instance to one or more power delay circuits to delay the provided control circuitry power ready signal in the first memory instance.

10. The method of claim 1, wherein the one or more bitcell arrays comprise one or more arrays of static random access memory (SRAM).

11. The method of claim 1, further comprising an OR gate coupled to the power down input and a delayed power signal within the first memory instance.

12. The method of claim 1, wherein peripheral circuitry of the second memory instance comprises control circuitry used to control operation of the one or more bitcell arrays in the second memory instance.

13. An apparatus, comprising:
a first memory instance comprising one or more first bitcell arrays, a first power input terminal to receive a power down signal, a first output terminal to provide a delayed bitcell array power ready signal, and a second output terminal to provide a control circuitry power ready signal; and
a second memory instance comprising one or more second bitcell arrays, a second power input terminal to receive the delayed bitcell array power ready signal, and a retention power input terminal to receive the control circuitry power ready signal, the second memory instance comprising circuitry such that the control circuitry power ready signal received at the retention power input terminal of the second memory instance controls application of power to peripheral circuitry of the second memory instance.

14. The apparatus of claim 13, wherein:
the second memory instance further comprises circuitry to provide a second delayed bitcell array power ready signal at a first output terminal of the second memory instance and a second control circuitry power ready signal at a second output terminal of the second memory instance; and
the apparatus further comprises a third memory instance comprising one or more third bit cell arrays to receive the second delayed bitcell array power ready signal at a power input terminal of the third memory instance and receive the second control circuitry power ready signal at a retention power input terminal of the third memory instance, the third memory instance comprising circuitry such that the second control circuitry power ready signal received at the retention power input terminal of the third memory instance controls application of power to peripheral circuitry of the third memory instance.

15. The apparatus of claim 13, further comprising circuitry to apply the power down signal to one or more power delay circuits formed in the first memory instance to provide the delayed bitcell array power ready signal.

16. The apparatus of claim 15, wherein at least one of the one or more power delay circuits comprises one or more of a wire length sufficient to impart a desired resistance-capacitance delay on the delayed bitcell array power ready signal or one or more inverters or buffers, or a combination thereof.

17. An article comprising:
a non-transitory computer-readable medium to store computer-readable code for fabrication of a memory device comprising:
a first memory instance to be formed in a circuit device, the first memory instance to comprise one or more first bitcell arrays, a first power input terminal to receive a power down signal, a first output terminal to provide a delayed bitcell array power ready signal, and a second output terminal to provide a control circuitry power ready signal; and
a second memory instance to be formed in the circuit device, the second memory instance to comprise one or more second bitcell arrays, a second power input terminal to receive the delayed bitcell array power ready signal, a retention power input terminal to receive the control circuitry power ready signal, and circuitry to apply the control circuitry power ready signal received at the retention power input terminal of the second memory instance to control application of power to peripheral circuitry of the second memory instance.

18. The article of claim 17, wherein:
the second memory instance further comprises circuitry to provide a second delayed bitcell array power ready signal at a first output terminal of the second memory instance and a second control circuitry power ready signal at a second output terminal of the second memory instance; and
the memory device further comprises a third memory instance in the circuit device, the third memory instance to receive the second delayed bitcell array power ready signal at a power input terminal of the third memory instance and receive the second control circuitry power ready signal at a second retention power input terminal of the third memory instance, the third memory instance comprising circuitry such that the second control circuitry power ready signal received at the retention power input terminal of the third memory instance controls application of power to peripheral circuitry of the third memory instance.

19. The article of claim 17, wherein the memory device further comprises circuitry to apply the power down signal to one or more power delay circuits formed in the first memory instance to provide a delayed bitcell array power ready signal.

20. The article of claim 19, wherein at least one of the one or more power delay circuits comprises one or more of a wire length sufficient to impart a desired resistance-capacitance delay on the delayed bitcell array power ready signal or one or more inverters or buffers, or a combination thereof.

* * * * *